United States Patent
Bauer

(10) Patent No.: US 6,650,946 B2
(45) Date of Patent: Nov. 18, 2003

(54) APPARATUS AND METHOD FOR PLANNING AND CONTROLLING PRODUCTION SEQUENCES

(75) Inventor: Jörg Bauer, Neckargemünd (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 389 days.

(21) Appl. No.: 09/734,462

(22) Filed: Dec. 11, 2000

(65) Prior Publication Data

US 2001/0039461 A1 Nov. 8, 2001

(30) Foreign Application Priority Data

Dec. 9, 1999 (DE) .......................... 199 59 389

(51) Int. Cl.$^7$ .............................................. G05B 11/01
(52) U.S. Cl. ................. 700/23; 700/7; 700/9; 700/11; 700/100; 100/4; 100/43; 355/401; 358/1.1; 358/1.5; 358/1.6; 358/1.15
(58) Field of Search ............... 700/7, 9, 11, 17–18, 700/19, 20, 23, 100, 83, 86, 95–96; 100/2, 4, 43; 355/401, 97; 358/1.1, 1.5, 1.6, 1.15 1.16

(56) References Cited

U.S. PATENT DOCUMENTS

| 4,947,397 | A | * | 8/1990 | Sobel et al. ................... 714/45 |
|---|---|---|---|---|
| 5,224,207 | A | * | 6/1993 | Filion et al. ................... 358/1.1 |
| 5,295,233 | A | * | 3/1994 | Ota ............................ 358/1.16 |
| 5,512,928 | A | * | 4/1996 | Kato et al. .................... 347/138 |
| 6,295,117 | B2 | * | 9/2001 | Haraguchi et al. ............. 355/40 |
| 6,317,217 | B1 | * | 11/2001 | Toda .......................... 358/1.11 |
| 6,493,597 | B1 | * | 12/2002 | Linares et al. ................. 700/83 |
| 6,509,977 | B1 | * | 1/2003 | Kujirai et al. .............. 358/1.18 |

FOREIGN PATENT DOCUMENTS

| DE | 40 13 286 A1 | 10/1991 |
|---|---|---|
| DE | 43 29 886 A1 | 3/1995 |
| GB | 2 244 457 | 12/1991 |

* cited by examiner

Primary Examiner—Ramesh Patel
(74) Attorney, Agent, or Firm—Laurence A. Greenberg; Werner H. Stemer; Ralph E. Locher

(57) ABSTRACT

An apparatus for planning and controlling production sequences, in particular printing processes in a printing system. The apparatus includes a sequence control apparatus formed of at least one data input unit, a data output unit, a data processing system and a memory unit, which are connected so as to communicate with one another and with the printing system. The apparatus also includes at least one planning board, which has display elements for displaying individual or a number of printing processes. In addition, a method of planning and controlling the production sequences is described.

32 Claims, 1 Drawing Sheet

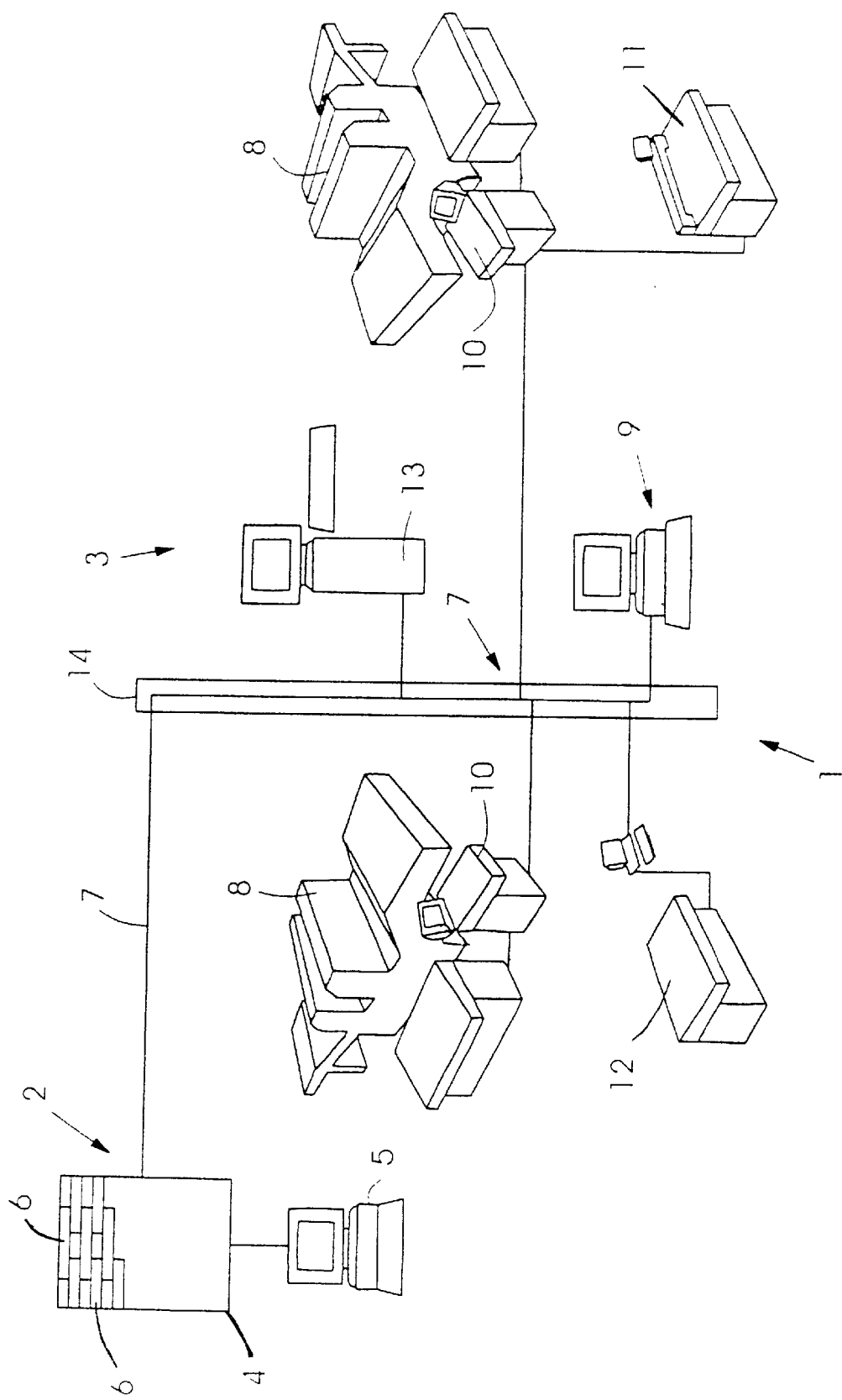

APPARATUS AND METHOD FOR PLANNING AND CONTROLLING PRODUCTION SEQUENCES

BACKGROUND OF THE INVENTION

Field of the Invention

The invention relates to an apparatus and method for planning and controlling production sequences, in particular printing processes in a printing system. The apparatus has a sequence control apparatus, which contains at least one data input unit, a data output unit, a data processing system and a memory unit, which are connected so as to communicate with one another and with the printing system. The apparatus also has at least one planning board, which has display elements for displaying individual or a number of printing processes.

In addition, the invention relates to a method of planning and controlling the production sequences, in particular printing processes in a printing system, by using the sequence control apparatus. Sequence data of a printing process is input via the data input unit to a data processing system. The sequence data is stored in a memory unit and transmitted to the printing system by a data output unit. The printing processes are coordinated and synchronized on a planning board that has display elements for displaying individual or a number of printing processes.

Apparatus and methods of this type are known. They are used for planning printing sequences, in particular for coordinating and scheduling individual print jobs in all the current or planned print jobs, forwarding the planning data to automated printing systems and implementing and possibly changing sequence data belonging to the printing processes.

Published, Non-Prosecuted German Patent Application DE 43 29 886 A1 describes an apparatus and a method for controlling the sequence of printing processes. In the apparatus, there is an updatable memory unit and a data processing system, in which the mutual exclusion of colliding decisions is checked and indicated, the sequences being controlled at networked data input units.

In this case, the networked sequence control apparatus is optimized in such a way that data relating to a job and/or machine can be displayed both at a higher-order level and at a lower-order level. Necessary data changes at any desired point in the printing system are transmitted to the remaining networked units. Printing processes to be run in the future can be planned on devices for displaying process parameters, irrespective of the printing process currently being carried out. In addition, sequence data can be transmitted to the machines in the printing system. By networking the individual units involved in carrying out the print job, the operating personnel can gain an overview of the state of the printing sequences without other units in the printing process being affected negatively.

The redundancy of the data transmission between machines and other units of the production sequence, on the one hand, and machines and data processing system, on the other hand, increases the flexibility within the sequences, in particular printing production, considerably. At monitors and workstations, screen interfaces can be called up in a standardized manner, which makes it possible to display branches in sections of the printing sequences. Consequently, as early as when preparing a new print job to be carried out, it is already possible to prepare scheduling and coordination.

In the memory unit, a list of contents with the respectively applicable system conditions is set up, so that when data transmissions from the memory unit are made, a standardized data organization is ensured. Process parameters from printing machines, folding machines, cutting and further processing machines, and from the pre-press area, can be displayed on monitors.

In addition, a method for sequence control in printing production processes is disclosed. In the method data relating to the machine-specific execution of a process is output on screen interfaces, branches to other process sections relevant to a process are called up, data originally output on the screen interface are changed and changed data are transmitted to the memory unit and data processing system. It is further possible for process parameters independent of the current printing process to be called up irrespective of future production processes.

At the planning stage of the printing process, such a system has proven to be incomprehensible, since the complex sequences of a number of print jobs exceed the display capacity of monitors and displays belonging to the data processing system and the machines. In addition, the planning of future print jobs cannot be displayed in the system, as a result of continuous management of the data of the current and the future jobs. Such a system is incomprehensible and is therefore time-consuming and expensive.

For the complex planning of printing sequences in a printing system, planning boards are therefore used, on which cards or job boards associated with individual jobs are disposed and fixed manually. The position and the identification of the cards or job boards are used to determine the scheduling and coordination of jobs in the overall sequence of the printing process in a printing system and to input the scheduling and coordination into a data processing system for controlling the printing system, as already disclosed by Published, Non-Prosecuted German Patent Application DE 43 29 886 A1. These essentially manual operations during planning, in particularly scheduling and coordination of printing sequences, the setting up of the printing machines and the input of the data from the planning board into the data processing system are likewise time-consuming and therefore costly, and the possibility of transmission errors is high.

SUMMARY OF THE INVENTION

It is accordingly an object of the invention to provide an apparatus and a method for planning and controlling production sequences which overcome the above-mentioned disadvantages of the prior art devices and methods of this general type, which permit flexible scheduling and coordination of the print jobs and improved utilization of the printing system, as well as an improved sequence organization.

With the foregoing and other objects in view there is provided, in accordance with the invention, an apparatus for planning and controlling production sequences. The apparatus is formed of a sequence control apparatus that is to be connected to a printing system for controlling printing processes formed of sequence data. The sequence control apparatus includes a data input unit, a data output unit, a data processing system, and a memory unit. The data input unit, the data output unit, the data processing system and the memory unit are connected to each other so as to communicate with one another and the printing system. A planning board is connected to and communicates with the sequence control apparatus. Display elements are provided for displaying the printing processes on the planning board. The sequence data of a printing process is assigned to one of the display elements and the display element, individually or with others of the display elements, can be positioned on the planning board.

The solution according to the invention is provided by an apparatus in which the sequence data of at least one printing process is assigned to the display element. The display element, which, individually or with further display elements, can be positioned on the planning board and is connected so as to communicate with the sequence control apparatus. The advantage of the apparatus is that display elements that are disposed on the planning board and which are assigned to the print jobs to be processed are connected to the sequence control apparatus. By disposing the display elements on the planning board, the sequence of the production or printing process can be determined. New print jobs to be scheduled and coordinated can be preplanned and precalculated. It is possible to determine directly, taking into account the current processes, how much time is needed and when and how the print jobs can be integrated into the printing process. The communication between the planning area and the production area is ensured by the apparatus according to the invention in that interactive networking of the planning boards makes it possible to provide feedback from the production areas to the planning areas, which is assisted directly with data from the data processing system. The planning board permits the scheduling and coordination of the production sequences in the printing system with all the peripheral preprocessing and post processing machines in a manner that is clear and easily handled. The advantages of software-aided production can be combined with the advantages of software-aided planning.

It is advantageous that the sequence data and/or the position of the display elements on the planning board can be displayed as graphic symbols on the planning board and/or on the sequence control apparatus, and changed by the data input unit, preferably via a keyboard, mouse, track ball and/or touch-sensitive display. This makes it possible for the sequence data to be set up on each machine and on the planning board, and planning data transmitted to the data processing system and the memory unit, respectively, can always be looked at. The advantage of this configuration is primarily its greater flexibility in the utilization of the printing system. However, more rapid access to production data to be taken into account during planning is also achieved.

In a preferred refinement of the apparatus, changes can be updated on the planning board and/or in the sequence control apparatus. The optional capability of updating the data in the planning area has the advantage that, for example, unforeseeable delays in the production area can be noted immediately in the sequence control system and can be taken into account in current and future planning on the planning board.

A further refinement of the invention is provided by the planning board being provided with electronic/electromagnetic, optical and/or mechanical data input devices. Using the data input device, the sequence data and/or the position of the display elements of the printing process associated with the latter are input or read directly on the planning board and forwarded to the sequence control apparatus and the printing system. It is therefore advantageously possible, during the planning of the printing sequences, to input into the system via the planning board all the sequence data required for the incorporation and implementation of a print job, and therefore to schedule and to coordinate the print job in all of the sequence data transmitted to the printing system. In this case, the invention provides for the planning board to be configured as a touch-sensitive display, so that a change to the sequence data and/or the position of the display elements on the planning board is made possible by touching the display, which additionally increases the operating convenience.

A further refinement according to the invention provides for the planning board for displaying the display elements to be configured as a large-area display, preferably as a screen, projection screen with beamer or projector or a screen array, which advantageously ensures good comprehensibility. The sequence data and/or the position of the display elements on the planning board are advantageously transmitted to the sequence control apparatus by data transmission, preferably remote data transmission, so that data processing programs belonging to the sequence control apparatus can process the data for further use and forward it to the printing system to control the printing processes. In this case, the display elements are controlled via the data input unit.

An alternative refinement of the invention provides for the sequence data of at least one printing process to be assigned to a display element which has a data carrier, which stores the sequence data and, individually or with further display elements, can be positioned on the planning board. This apparatus is advantageous in order that, on planning boards which are not directly connected so as to communicate with the sequence control via a data input unit, the necessary sequence data can be provided and disposed on the display elements in such a way that it can be read by a data acquisition device and transmitted to the sequence control. For this purpose, provision is first made for the sequence data and/or the position of the display elements to be stored on the data carrier, preferably by bar coding or electromagnetic coding and to be capable of being read by the data acquisition device, preferably data reading devices such as bar-code readers or electromagnetic sensors. Second, the apparatus can be configured such that the display elements can be fixed mechanically to the planning board and that the contact devices on the planning board and the display element establish a data connection between the data carrier and the sequence control apparatus, so that the sequence data and/or the position of the display elements can be read from the data carrier and transmitted to the sequence control apparatus. Advantageously, manual planning on the planning board is possible in this way, without the data having to be input manually to the sequence control apparatus. Therefore, input errors can be avoided and the data organization can be improved.

It is preferable if the printing system provided with the apparatus according to the invention contains the printing machine and preprocessing and/or post processing machines, preferably printing-plate readers, inking and format presetting apparatus, folding machines and cutting machines, which are connected so as to communicate with the sequence control apparatus, the planning board and one another and can be integrated into the printing process by the display elements on the planning board. This refinement advantageously makes it possible to manage the sequence data of the print jobs, and their scheduling and coordination for all the operations required for the print job.

The invention provides for the integration of the apparatus in a method for planning and controlling production sequences, in particular printing processes in a printing system. The sequence data of a printing process is input via the data input unit and forwarded to the data processing system, stored in a memory unit and transmitted to the printing system by the data output unit. On the planning board, which has the display elements for displaying individual or a number of printing processes, the printing processes are coordinated and scheduled. The sequence data of at least one printing process is assigned to a display element. The display element is positioned and displayed on the planning board, individually or with further display elements. The sequence data and the position of the display element on the planning board are transmitted to the sequence control apparatus. The sequence data and/or the position of the display elements on the planning board are changed via a data input unit, preferably via a keyboard, mouse, track ball and/or touch-sensitive display, on the planning board and/or on the sequence control apparatus. Changes on the planning board and/or in the sequence control apparatus can preferably be updated synchronously. In addition, provision is made to input the sequence data and/or the position of the display elements, and also changes, directly via the planning board by an electronic, electromagnetic, optical and/or mechanical data acquisition device. These can preferably be a keyboard, a mouse, a track ball and/or a touch-sensitive display, but also data reading devices, such as bar-code readers, scanners or light pens.

If the input of or changes to the sequence data and/or the position of the display elements are set up via a touch-sensitive display on the planning board, the display elements can be shifted, changed and/or deleted by touching the planning board. If the sequence data and/or the position of the display elements are merely displayed on the planning board, and the input is made via a separate data input unit, the planning board can be configured as a screen, projection screen with beamer or projector or screen array. In this case, the display elements on the display surface of the planning board are controlled via the data input unit. This configuration is cost-effective and can be produced with devices belonging to conventional data processing systems, since simple microcomputers with an appropriate link with the planning board can be used. Data transmission is used to transmit the sequence data and/or the position of the display elements to the sequence control apparatus. For this purpose, it is appropriate to network the sequence control apparatus, the printing system and the planning board. Remote data transmission by radio technology can also be used for this purpose according to the invention. By use of data processing programs belonging to the sequence control apparatus, the data is processed for further use and forwarded to the printing system and the memory unit to control the printing processes. A further refinement of the apparatus makes it possible to store the sequence data on a data carrier connected to the display elements, and to position the display elements, individually or with further display elements, manually on the planning board. The data is stored on the data carrier, preferably by bar coding or electromagnetic coding, and is read by data reading devices such as bar-code readers or electromagnetic sensors, and transmitted to the sequence control apparatus.

It is possible to fix the display elements mechanically to the planning board, contact devices being provided on the planning board, which establish a data connection between data carrier and sequence control apparatus, so that the sequence data and/or position of the display elements can be transmitted from the data carrier to the sequence control apparatus.

Other features which are considered as characteristic for the invention are set forth in the appended claims.

Although the invention is illustrated and described herein as embodied in an apparatus and a method for planning and controlling production sequences, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a schematic illustration of an apparatus with a printing system and planning board according to the invention.

DESCRIPTION OF THE PREFERRED EMBODIMENTS

Referring now to the single FIGURE of the drawing in detail, there is shown an apparatus 1 according to the invention which is illustrated schematically. The apparatus 1 contains a planning area 2 and a production area 3. The planning area 2 has a planning board 4 and a data input device 5. Display elements 6 are displayed on the planning board 4, and positioned in accordance with their envisaged position in the production sequence, which is illustrated as a printing process.

The planning area 2 is connected to the production area 3 via a network 7. The same network 7 is led onward in the production area and connects the individual components of the printing process. Via the network 7, communication is therefore possible from the planning board 4 to a printing machine 8, to a data processing system 9 and to data processing terminals 10 on the printing machines 8 and preprocessing and post processing machines 11, 12 of the printing process, and a memory unit 13. A data bus 14, which administers the data transport reliably, is preferably a constituent part of the network 7. In order to position the display element 6 on the planning board 4, the sequence data of the printing presses is first assigned to the display element 6. This is done at the data input unit 5 of the planning board 4. From there, the display elements 6 are then disposed and displayed on the planning board 4 by data management programs. For conventional scheduling and coordination of print jobs, it is necessary to change the display elements 6 or their position and to adapt them to new predefinitions. These changes are likewise possible via the data input unit 5. Once planning has been completed, the sequence data of the print job and the position of the display element 6 are transmitted to the data processing system 9 and the memory unit 13 via the data bus 14 of the network 7. There, the print jobs are scheduled and processed in accordance with the sequence data and according to the selected position on the planning board 4. At the same time, the individual printing processes are managed by the data processing system 9, and the necessary printing machines 8 and the machines 11, 12 for preprocessing and post processing, such as folding, binding, etc., are incorporated in the sequence. In the event of central control, the data processing system 9 can undertake the updating of all the data processing terminals 10 on the machines. In the case of decentralized control, this task can be performed, for example, by the data bus 14, which must be equipped with appropriate devices for this purpose.

Standardized symbolism of the display elements 6 on the planning board 4 achieves the situation where data can be understood quickly by the operating personnel, as a result of which the operating personnel can be relieved of stress and the number of operating errors can be reduced.

For optimal planning it is necessary for the data from the production area 3 to be available to the planning area 2 as well and, conversely, for the planning data to be available to the production area 3. This can be carried out by automatic updating of the data on the data processing system 9 and the memory unit 13, and by the dispatch of the production data to the planning area 2 and of the planning data to the production area 3. One possible alternative to this would be to send only process-dependent data to the planning area 3. This could preferably be carried out from the data processing terminals 10 of the printing machines 8. In addition, it is possible to make the planning data available centrally in the memory unit 13 so that it can be called up by production.

The invention provides for the planning board 4 to be generated as a projection of an image, compiled by the data input unit 5, on a wall, a large-size screen or a screen array. This image would then be capable of being changed via a mouse or track ball on the data input unit 5. A preferred embodiment of the invention is produced by a touch-sensitive display area, via which the configuration of the display elements 6 can be performed directly.

In any case, changing the display on the planning board 4 by "drag and drop" technology is provided, in which the display elements 6 are clicked on by using the conventional data processing device, for example a cursor, dragged to the envisaged position on the planning board 4 and positioned there (dropped).

Conventional data processing programs for controlling the sequence of printing processes can in this way be linked with the planning software provided, and the entire production process and the production planning can be set up with considerable cost and time advantages. Simulations of production sequences are likewise possible, as are central quality management and business management evaluation.

The setting up of access rights to planning or production data and the configuration of the data transfer between the areas of planning and production and between the components of production itself can be implemented with conventional data processing devices.

I claim:

1. An apparatus for planning and controlling production sequences, comprising:
    a sequence control apparatus to be connected to a printing system for controlling printing processes formed of sequence data, said sequence control apparatus including:
        a data input unit;
        a data output unit;
        a data processing system; and
        a memory unit, said data input unit, said data output unit, said data processing system and said memory unit being connected to each other to communicate with one another and the printing system;
    a planning board connected to and communicating with said sequence control apparatus; and
    display elements for displaying different print jobs associated with the printing processes on said planning board, the sequence data of a printing process being assigned to one of said display elements and at least said one of said display elements to be positioned on said planning board and is connected to communicate the different print jobs associated with at least one of the printing processes to said sequence control apparatus and to take into account printing process time needed for each print job.

2. The apparatus according to claim 1, wherein at least one of the sequence data and a position of said display elements on said planning board can be displayed as graphic symbols, and controlled and changed by said data input unit.

3. The apparatus according to claim 2, wherein changes to said display elements can be updated on at least one of said planning board and said sequence control apparatus.

4. The apparatus according to claim 2, wherein said planning board has a data acquisition device selected from the group consisting of electronic data acquisition devices, electromagnetic data acquisition devices, optical data acquisition devices and mechanical data acquisition devices.

5. The apparatus according to claim 2, wherein said planning board is a touch-sensitive display, which permits the sequence data and the position of said display elements to be changed by touching said planning board.

6. The apparatus according to claim 1, wherein said planning board for displaying said display elements is a large-area display selected from the group consisting of screens, projection screens with a beamer, projection screens with a projector, and screen arrays.

7. The apparatus according to claim 1, wherein the sequence data and a position of said display elements on said planning board can be transmitted to said sequence control apparatus by a data transmission unit, including a remote data transmission unit, and data processing programs belonging to said sequence control apparatus process the sequence data for further use and forward it to the printing system to control the printing processes.

8. The apparatus according to claim 1, wherein the sequence data is displayed on more than one of said display elements.

9. The apparatus according to claim 2, wherein said data input unit has at least one of a keyboard, a mouse, a track ball and a touch-sensitive display.

10. The apparatus according to claim 1, wherein the printing system includes a printing machine and at least one of preprocessing machines and post-processing machines which are connected to communicate with said sequence control apparatus, said planning board and one another and can be integrated into the printing process by said display elements on said planning board.

11. The apparatus according to claim 10, wherein said preprocessing machines and said post-processing machines are selected from the group consisting of printing-plate readers, inking and format presetting apparatus, folding machines and cutting machines.

12. An apparatus for planning and controlling production sequences, comprising:
    a sequence control apparatus to be connected to a printing system for controlling printing processes formed of sequence data, said sequence control apparatus including:
        a data input unit;
        a data output unit;
        a data processing system; and
        a memory unit, said data input unit, said data output unit, said data processing system and said memory unit being connected to each other to communicate with one another and the printing system;
    a planning board;
    a data carrier connected to said planning board; and
    display elements disposed on said planning board for displaying at least one of the printing processes and different print jobs associated with the at least one of the printing processes, the sequence data of the at least one printing process being assigned to one of said display elements which is connected to said data carrier and at least said one of said display elements, to be positioned on said planning board to communicate the different print jobs associated with at least one of the printing processes and to take into account printing process time needed for each print job.

13. The apparatus according to claim 12, wherein at least one of the sequence data and a position of said display elements are stored by said data carrier, and said data carrier can be read by data reading devices and the sequence data and the position of said display elements can be transmitted to said sequence control apparatus.

14. The apparatus according to claim 13, wherein said data carrier can be written to by one of bar coding and electromagnetic coding.

15. The apparatus according to claim 12, wherein:
said display elements can be fixed mechanically to said planning board; and
said planning board and said display elements each have contact devices which establish a data connection between said data carrier and said sequence control apparatus, permitting the sequence data and the position of said display elements to be read from said data carrier and transmitted to said sequence control apparatus.

16. The apparatus according to claim 12, wherein the printing system includes a printing machine and at least one of preprocessing machines and post-processing machines which are connected to communicate with said sequence control apparatus, said planning board and one another and can be integrated into the printing process by said display elements on said planning board.

17. A method for planning and sequence control of production sequences, which comprises the steps of:
inputting sequence data of a printing process of a printing system to a data processing system using a data input unit;
storing the sequence data in a memory unit;
coordinating and planning different print jobs associated with printing processes on a planning board having display elements for displaying at least an individual printing process;
assigning the sequence data of different print jobs associated with at least one printing process to a display element, and positioning and displaying at least the display element on the planning board; and
transmitting the sequence data and the position of the display element on the planning board together with the different print jobs to a sequence control apparatus and accounting for the printing process time needed for each print job.

18. The method according to claim 17, which comprises changing the sequence data and a position of the display elements on at least one of the planning board and the sequence control apparatus using the data input unit.

19. The method according to claim 18, which comprises providing the data input unit with at least one input device selected from the group consisting of keyboards, computer mice, track balls and touch-sensitive displays.

20. The method according to claim 18, which comprises updating synchronously changes on the planning board and in the sequence control apparatus.

21. The method according to claim 18, including inputting the sequence data, the position of the display elements, and also changes, to the sequence control apparatus from the planning board using a data acquisition device.

22. The method according to claim 21, which comprises selecting the data acquisition device from the group consisting of electronic data acquisition devices, electromagnetic data acquisition devices, optical data acquisition devices and mechanical data acquisition devices.

23. The method according to claim 21, which comprises selecting the data acquisition device from the group consisting of keyboards, computer mice, track balls, touch-sensitive displays, data reading devices and light pens.

24. The method according to claim 18, which comprises:
setting up changes to at least one of the sequence data and the position of the display elements using a touch-sensitive display on the planning board;
displacing the display elements by touching the planning board;
changing the display elements by touching the planning board; and
deleting the display elements by touching the planning board.

25. The method according to claim 18, which comprises:
displaying the sequence data and the position of the display elements on the planning board on a screen selected from the group consisting of projection screens with beamers, projection screens with projectors, and a screen array; and
transmitting the sequence data and the position to the sequence control apparatus by a data transmission, and in that data processing programs belonging to the sequence control apparatus process the sequence data for further use and forward it to the printing system and the memory unit to control the printing processes.

26. The method according to claim 18, which comprises controlling a sequence of the printing process using the sequence control apparatus in accordance with at least one of the sequence data and the position of the display elements on the planning board for controlling printing machines and at least one of preprocessing machines and post processing machines of the printing system.

27. A method of planning and controlling production sequences, which comprises the steps of:
providing a sequence control apparatus for controlling printing processes of a printing system, the sequence control apparatus formed of a data input unit, a data output unit, a data processing system and a memory unit connected to communicate with one another and with the printing system;
providing a planning board having display elements for displaying different print jobs associated with at least one of individual printing processes;
assigning sequence data of different print jobs associated with the at least one of the printing processes to a display element;
storing the sequence data for the different print jobs and accounting for printing process time needed for each print job in a data carrier connected to the display element; and
positioning at least one of the display elements on the planning board.

28. The method according to claim 27, which comprises:
storing at least one of the sequence data and a position of the display elements in the data carrier using one of bar coding and electromagnetic coding;
reading the data carrier; and
transmitting at least one of the sequence data and the position of the display elements to the sequence control apparatus.

29. The method according to claim 28, which comprises reading the data carrier using a data reader selected from the group consisting of bar-code readers and electromagnetic sensors.

30. The method according to claim 27, which comprises:
fixing the display elements mechanically to the planning board; and
using contact devices on the planning board and on the display element for establishing a data connection between the data carrier and the sequence control apparatus, for reading at least one of the sequence data and the position of the display elements from the data carrier and transmitting the at least one of the sequence data and the position of the display elements to the sequence control apparatus.

31. The method according to claim 27, which comprises controlling a sequence of the printing process using the sequence control apparatus in accordance with at least one of the sequence data and the position of the display elements on the planning board for controlling printing machines and at least one of preprocessing machines and post-processing machines of the printing system.

32. The method according to claim 31, which comprises selecting the preprocessing machines and the post-processing machines from the group consisting of printing-plate readers, inking and format presetting devices, folding machines and cutting machines.

* * * * *